UNITED STATES PATENT OFFICE.

BULOW W. MARSTON, OF SHREVEPORT, LOUISIANA.

INSECTICIDE.

No. 920,598.  Specification of Letters Patent.  Patented May 4, 1909.

Application filed March 12, 1909. Serial No. 483,064.

*To all whom it may concern:*

Be it known that I, BULOW W. MARSTON, a citizen of the United States, residing at Shreveport, in the parish of Caddo and State of Louisiana, have invented new and useful Improvements in Insecticides, of which the following is a specification.

This invention relates to an insecticide for the destruction of the boll weevil, an insect infesting cotton plants, and its object is to provide a liquid insecticide which may be sprayed or otherwise applied to the plants, which may be produced and sold at a low cost, and which is highly efficient for its intended purpose.

In carrying my invention into practice, I employ a composition of the following ingredients, to wit: paris green one part; sugar, two parts, bicarbonate of soda, one quarter part; strychnia, four grains to each ounce of paris green; starch, one part; and water, thirty-two parts. Each part may consist of an ounce, dry measure. The solid particles are dissolved in the water, the sugar making the resultant composition sufficiently sweet to attract the insects and cause them to come out of the boll and eat the coating of the composition on the surface of the boll and adjacent portions of the plant, while the bicarbonate of soda promotes the solubility of the paris green in the water, and the starch in connection with the sugar keeps the insoluble matter in suspension and forms a coating on the plant when the water evaporates which prevents to a high degree the washing off of the substance from off the plant by rains.

An insecticide of this composition may be produced and sold at a low cost, and has been found highly effective for its stated purpose.

Having thus fully described the invention, what is claimed as new, is:—

1. An insecticide consisting of paris green, strychnia, sugar, starch, bicarbonate of soda, and water.

2. An insecticide consisting of paris green, 1 part, strychnia, 4 grains to each part of paris green, sugar 2 parts, starch 1 part, bicarbonate of soda, ¼ part, and water, 32 parts.

In testimony whereof I affix my signature in presence of two witnesses.

BULOW W. MARSTON.

Witnesses:
  KATHRIN GILLETTE,
  REBECCA KAPP.